United States Patent Office 2,742,512
Patented Apr. 17, 1956

2,742,512

ALKYLATION OF HYDROCARBONS

Abraham Schneider, Philadelphia, Pa., assignor to Sun Oil Company, Philadelphia, Pa., a corporation of New Jersey No Drawing. Application September 22, 1953,
Serial No. 381,753

13 Claims. (Cl. 260—668)

This invention relates to the alkylation of aromatic hydrocarbons with monoalkyl benzenes, and more specifically relates to the alkylation of certain mononuclear aromatic hydrocarbons with monoalkyl benzenes having at least 2 carbon atoms in the alkyl group.

One specific embodiment of the invention relates to a process for producing a diarylalkane hydrocarbon which comprises reacting under specific conditions, as hereinafter defined, a mononuclear aromatic hydrocarbon such as benzene with a monoalkyl benzene such as ethylbenzene by subjecting a mixture thereof to the action of a tertiary alkyl halide and aluminum chloride or aluminum bromide. It has been found that under these conditions the monoalkyl benzene alkylates the mononuclear aromatic to form a diarylalkane hydrocarbon, and that alkylation of either aromatic reactant with the tertiary alkane halide is not observed to an appreciable extent.

In order to illustrate the process of the invention, tertiary butyl chloride is added to an admixture of benzene, ethylbenzene, and aluminum chloride, while maintaining the temperature of the reaction mixture within the range of from 50° C. to 110° C. The reaction product of benzene and ethylbenzene, 1,1-diphenylethane, can be recovered from the reaction mixture by distillation. Under optimum conditions of reaction, substantially no tertiary butyl benzene or tertiary butyl ethylbenzene is observed. This reaction is illustrated by the following equation:

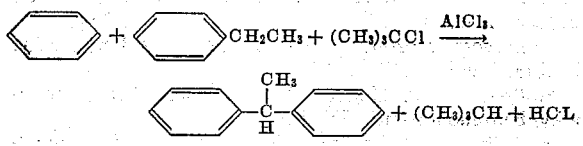

In my copending application, Serial No. 381,751 filed September 22, 1953, the dimerization of mononuclear aromatics such as ethylbenzene under the influence of a t-alkyl halide and aluminum chloride is described. In the presence of benzene and under the reaction conditions herein defined, the dimerization reaction of Serial No. 381,751 is substantially completely suppressed so that the dimer of the monoalkyl aromatic in the present process does not form a component of the reaction mixture.

Benzene is the preferred mononuclear aromatic hydrocarbon to employ. However, the benzene nucleus may be substituted with from 1 to 4 methyl groups and good results obtained therewith. For example, toluene, the xylenes, and the trimethyl benzenes, such as mesitylene give good results.

Monoalkyl benzenes which can be employed in the process of the invention have the formula

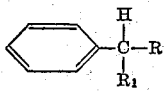

wherein R in an alkyl radical or a cycloalkyl radical having from 1 to 20 carbon atoms, and wherein $R_1$ is an alkyl radical or a cycloalkyl radical having from 1 to 20 carbon atoms, or a hydrogen atom. The alkyl benzene thus has at least two carbon atoms in the alkyl group, and at least one hydrogen atom is attached to the carbon atom of the alkyl group which is joined to the benzene nucleus. The alkylation products of the process have the formula

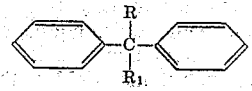

and are formed as above shown for the alkylation of benzene with ethylbenzene; R and $R_1$ are as above described. Also, the phenyl radical from the mononuclear aromatic reactant may have from 0 to 4 methyl groups attached to nuclear carbon atoms.

Ethylbenzene and cumene (isopropylbenzene) are preferred reactants in the present process. Other monoalkyl benzenes which may be employed include, for example, n-propylbenzene, secondary butylbenzene, isobutylbenzene, secondary amylbenzene, 1-phenyl-3-methylbutane, phenylcyclohexylmethane, 1-phenyl-2-cyclohexylethane and the like. The monoalkyl benzene reactant is preferably substantially free of other hydrocarbons, and best results are obtained when the presence of other hydrocarbons is maintained below 10%. However, hydrocarbons which do not react under the conditions employed, such as normal paraffins, may be present to an extent of about 40% without adversely affecting the reaction. Isoparaffins react under the conditions employed in the process, and hence they should not be present to an appreciable extent.

The t-alkyl halide to employ must be a t-alkyl chloride or a t-alkyl bromide. By "t-alkyl halide," and terms of similar import, is meant an alkyl halide wherein the halogen atom is attached to a tertiary carbon atom, i. e. an alkyl halide wherein the halogen atom is attached to a carbon atom, which carbon atom in turn is attached to 3 other carbon atoms. Tertiary butyl chloride is the preferred alkyl halide. Other alkyl halides which can be employed include, for example, 2-chloro-2-methylbutane, 2-chloro-2-methylpentane, 3-chloro-3-ethylpentane, t-butyl-bromide, 2-bromo-2-methylbutane, and homologues thereof. Secondary chlorides and bromides, i. e., halides wherein the halogen atom is attached to a secondary carbon atom, which have at least 4 carbon atoms are rearranged under the conditions of the reaction to a corresponding tertiary halide, and hence can be employed. Secondary halides which can be employed are illustrated by secondary butylbromide, 1-chloro-1-methylbutane, and 1-chloro-1-ethylbutane. It is preferred, however, to employ tertiary halides as above described.

Aluminum chloride is the preferred catalyst to employ. However, aluminum bromide can be used under the same conditions of reaction as aluminum chloride, and gives good results especially where the tertiary alkyl halide employed is a tertiary alkyl bromide.

The mole ratio of tertiary alkyl halide to monoalkyl benzene is preferably maintained within the range of from 0.1:1 to 1:1. Where the mole ratio is about 0.1:1, a relatively high yield of the diarylalkane based on conversion is obtained, while at higher mole ratios a higher total conversion is obtained. The quantity of aluminum chloride to employ is not critical but is advantageously maintained within a mole ratio of aluminum chloride to tertiary halide of from 0.05:1 to 1:1.

The preferred mole ratio of mononuclear aromatic to monoalkyl benzene is from 0.5:1 to 10:1 and excellent results are obtained when the mole ratio is from 1:1 to 2:1.

It is essential to the successful operation of the present process that the temperature of reaction be maintained with the range of from 50 to 110° C. At temperatures below 50° C., alkylation of both of the aromatic reactants with the tertiary alkyl halide is observed to a substantial extent and at temperatures above 110° C. a wide variety of products is obtained due to reaction of the desired product under the influence of aluminum chloride. Accordingly, it is essential that the temperature of reaction be maintained within the range of from 50° C. to 110° C. The pressure to employ is not critical so long as reaction is maintained in the liquid phase. In general the pressure will vary from atmospheric up to about 500 p. s. i. Time is also not considered a critical variable, it being apparent that sufficient time should be allowed to obtain a substantial yield of the desired product. The usual time of reaction will be from 10 minutes to about 5 hours.

In carrying out the process of the invention, the tertiary alkyl halide and aluminum halide catalyst should not be contacted except in the presence of both the mononuclear aromatic and a monoalkyl benzene reactant. A preferred method for performing the process is to admix a mononuclear aromatic and monoalkyl aromatic with aluminum chloride and add the tertiary alkyl halide to the admixture.

The following examples illustrate embodiments of the process:

Example 1

Into a reactor equipped with agitating means and temperature control means was introduced 75 grams of ethylbenzene (0.707 mole); 78 grams of benzene (1.0 mole); and 12 grams of aluminum chloride (0.090 mole). To this continuously agitated mixture was added 50 grams (0.538 mole) of tertiary butyl chloride over a period of 140 minutes. The temperature of the reactant mixture was maintained at 55° C. Isobutane, evolved in the reaction, was continuously removed from the reactor. The reaction mixture was yielded to stratify and the organic layer separated from the catalyst layer. The organic layer was distilled to separate components thereof. There was recovered about 18 g. (0.099 mole) of 1,1-diphenylethane, the product of alkylating benzene with ethylbenzene.

Other products obtained were isobutane, 24.7 g. (0.425 mole); benzene, 4.3 g. (0.55 mole); ethylbenzene, 16.4 g. (0.155 mole); t-butyl benzene, 5.1 g. (0.038 mole). No diethylbenzene or tertiary butylethylbenzene was observed. About 14.5 grams of a higher boiling material was obtained. At higher temperatures within the limits above described, the formation of t-butylbenzene was suppressed and formation of 1,1-diphenylethane enhanced.

Example 2

The procedure of Example 1 was repeated substituting cumene for ethylbenzene. In the reaction there was employed 84 g. (0.70 mole) of cumene, 78 g. (1.0 mole) benzene, 12 g. (0.09 mole) aluminum chloride and 50 g. (0.538 mole) of tertiary butyl chloride. The time of addition of tertiary butyl chloride was 105 minutes. The temperature of the reaction mixture was maintained within the range of from 55° C. to 60° C. There was obtained 9 grams (0.046 mole) of 2,2-diphenylpropane, the product of alkylating benzene with cumene.

Other products and their reaction consisted of isobutane, 15.5 g. (0.27 mole); benzene, 57 g. (0.73 mole); cumene, 35.7 (0.30 mole), and a small amount of higher boiling material. In this reaction no tertiary butylbenzene, diisopropylbenzene, or tertiary butylcumene was observed.

The diaryalkane products of the present process can be used as lubricating oil additives, intermediates in the preparation of detergents, for the synthesis of other compounds, and the like.

When other mononuclear aromatics, as above described, are substituted for benzene and when other monoalkyl aromatics, as above described, are substituted for ethylbenzene or cumene, results substantially equivalent to those of the above examples are obtained. Substantially equivalent results are also obtained using other tertiary alkyl chlorides or tertiary alkyl bromides either with aluminum chloride or aluminum bromide.

The invention claimed is:

1. Process of alkylation which comprises reacting a mononuclear aromatic hydrocarbon having from 0 to 4 methyl groups attached to the aromatic nucleus with a monoalkyl benzene having the formula

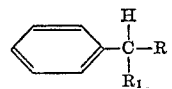

wherein R is a materail selected from the group consisting of alkyl radicals having from 1 to 20 carbon atoms and cycloalkyl radicals having from 1 to 20 carbon atoms, and wherein $R_1$ is a material selected from the group consisting of a hydrogen atom, alkyl radicals having from 1 to 20 carbon atoms and cycloalkyl radicals having from 1 to 20 carbon atoms in the presence of a material having at least 4 carbon atoms selected from the group consisting of tertiary and secondary alkyl chlorides and tertiary and secondary alkyl bromides and a catalyst selected from the group consisting of aluminum chloride and aluminum bromide, said reaction being performed in liquid phase at a temperature of from 50° C. to 110° C.

2. Process of alkylating benzene with a monoalkyl benzene having the formula

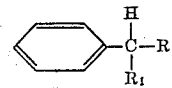

wherein R is a material selected from the group consisting of alkyl radicals having from 1 to 20 carbon atoms and cycloalkyl radicals having from 1 to 20 carbon atoms, and wherein $R_1$ is a material selected from the group consisting of a hydrogen atom, alkyl radicals having from 1 to 20 carbon atoms and cycloalkyl radicals having from 1 to 20 carbon atoms, which comprises reacting in liquid phase at a temperature of from 50° C. to 110° C. benzene with said monoalkyl benzene in the presence of a tertiary alkyl chloride and aluminum chloride.

3. Process according to claim 2 wherein said monoalkyl benzene is ethylbenzene.

4. Process according to claim 2 wherein said monoalkyl benzene is cumene.

5. Process according to claim 2 wherein said monoalkyl benzene is n-propylbenzene.

6. Process according to claim 2 wherein said monoalkyl benzene is secondary butylbenzene.

7. Process according to claim 2 wherein said monoalkyl benzene is secondary amylbenzene.

8. Process of alkylating toluene with a monoalkyl benzene having the formula

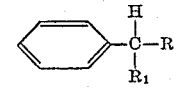

wherein R is a material selected from the group consisting of alkyl radicals having from 1 to 20 carbon atoms and cycloalkyl radicals having from 1 to 20 carbon atoms and wherein $R_1$ is a material selected from the group consisting of a hydrogen atom, alkyl radicals having from 1 to 20 carbon atoms and cycloalkyl radicals having from 1 to 20 carbon atoms which comprises reacting in liquid phase at a temperature of from 50° C. to 110° C. toluene with said monoalkyl benzene in the presence of a tertiary alkyl chloride and aluminum chloride.

9. Process according to claim 8 wherein said monoalkyl benzene is ethylbenzene.

10. Process for the preparation of 1,1-diphenylethane which comprises contacting a mixture of benzene and ethylbenzene with a tertiary butyl chloride and aluminum chloride, said contacting being performed in liquid phase at a temperature from 50 C. to 110° C., and separating 1,1-diphenylethane from the reaction mixture.

11. Process according to claim 10 wherein the tertiary butyl chloride is added to an admixture of benzene, ethylbenzene, and aluminum chloride.

12. Process for the preparation of 2,2-diphenylpropane which comprises contacting a mixture of benzene and cumene with tertiary butyl chloride and aluminum chloride, said contacting being performed in liquid phase at a temperature of from 50° C. to 110° C., and separating 2,2-diphenylpropane from the reaction mixture.

13. Process according to claim 12 wherein the tertiary butyl chloride is added to an admixture of cumene, benzene, and aluminum chloride.

References Cited in the file of this patent

UNITED STATES PATENTS 2,673,224  Kennedy et al. -------- Mar. 23, 1954